United States Patent
Sunila et al.

(10) Patent No.: US 12,476,722 B2
(45) Date of Patent: Nov. 18, 2025

(54) METHOD FOR ANALYSING ANTENNA DIRECTIONS IN A COMMUNICATION NETWORK

(71) Applicant: Elisa Oyj, Helsinki (FI)

(72) Inventors: Karri Sunila, Helsinki (FI); Vili Kilpeläinen, Helsinki (FI)

(73) Assignee: Elisa Oyj, Helsinki (FI)

( * ) Notice: Subject to any disclaimer, the term of this patent is extended or adjusted under 35 U.S.C. 154(b) by 348 days.

(21) Appl. No.: 18/275,650

(22) PCT Filed: Feb. 7, 2022

(86) PCT No.: PCT/FI2022/050075
§ 371 (c)(1),
(2) Date: Aug. 3, 2023

(87) PCT Pub. No.: WO2022/175588
PCT Pub. Date: Aug. 25, 2022

(65) Prior Publication Data
US 2024/0089014 A1    Mar. 14, 2024

(30) Foreign Application Priority Data
Feb. 17, 2021 (FI) ..................... 20215162

(51) Int. Cl.
*H04B 17/17*  (2015.01)
*H01Q 3/00*   (2006.01)
(Continued)

(52) U.S. Cl.
CPC .......... *H04B 17/17* (2015.01); *H04B 17/295* (2023.05); *H04W 24/08* (2013.01); *H01Q 3/005* (2013.01)

(58) Field of Classification Search
CPC ..... H04W 4/185; H04W 16/18; H04W 24/02; H04W 24/08; H04W 16/28; H04W 64/00;
(Continued)

(56) References Cited
U.S. PATENT DOCUMENTS 12,114,180 B2 * 10/2024 Zhang ................. H04W 16/28
2015/0011198 A1   1/2015 Wellington
(Continued)

FOREIGN PATENT DOCUMENTS

| CN | 109429249 A | * | 3/2019 | ............ H04W 24/02 |
| CN | 109587706 A | * | 4/2019 | ............ H04W 24/08 |

(Continued)

OTHER PUBLICATIONS

European Patent Office, International Search Report and Written Opinion, Application No. PCT/FI2022/050075, mailed May 9, 2022, 16 pages.
(Continued)

*Primary Examiner* — Lana N Le
(74) *Attorney, Agent, or Firm* — ZIEGLER IP LAW GROUP LLC.

(57) ABSTRACT

A computer implemented method for analysing antenna directions in a communications network. The method includes at least obtaining network related data; calculating a characteristic user direction of a first cell of a first base station; calculating a difference between the characteristic user direction and the antenna azimuth direction of the first cell; and responsive to detecting that the calculated difference is greater than a pre-set threshold angle, indicating an anomaly in the first cell.

11 Claims, 4 Drawing Sheets

---

421: Obtaining network related data comprising user equipment data.

422: Identifying locations of static user equipment of the first cell.

423: Calculating a centre of mass point of the static user equipment.

424: Calculating a direction of the centre of mass point from the first base station.

425: Setting the calculated direction as the characteristic user direction.

(51) Int. Cl.
*H04B 17/29* (2015.01)
*H04W 24/08* (2009.01)

(58) Field of Classification Search
CPC ....... H04W 4/02; H04W 4/021; H04W 4/029; H04W 4/40; H04W 64/006; H04W 64/003; H04W 24/10; H04W 72/046; H04B 17/17; H04B 17/295; H04B 7/06; H04B 7/08; H04B 7/06952; H04B 7/0617; H04B 7/088; H01Q 3/005; G01S 7/4808; G01S 3/14; G01S 19/42; G01S 5/0273; H04L 67/52
See application file for complete search history.

(56) References Cited

U.S. PATENT DOCUMENTS

| | | | | |
|---|---|---|---|---|
| 2015/0045048 A1* | 2/2015 | Kerhuel | ............... | H04W 64/003 |
| 2019/0324155 A1* | 10/2019 | Huang | ................... | G01S 19/42 |
| 2021/0359733 A1* | 11/2021 | Harrison | ................ | H04B 17/20 |
| 2021/0368358 A1* | 11/2021 | Sheng | ................... | H04W 16/28 |

FOREIGN PATENT DOCUMENTS

| | | | | |
|---|---|---|---|---|
| CN | 110602741 A | 12/2019 | | |
| EP | 2663120 A2 | 11/2013 | | |
| JP | 5696090 B2 | 4/2015 | | |
| WO | 2016154327 A1 | 9/2016 | | |
| WO | WO-2025044687 A1 * | 3/2025 | ............ | H04W 64/00 |

OTHER PUBLICATIONS

Finnish Patent and Registration Office, Search Report, Application No. 20215162, mailed Sep. 7, 2021, 2 pages.

* cited by examiner

411: Obtaining network related data comprising handover data.

412: Calculating, for each handover from the first cell to a target cell in another base station, a direction from the first base station to said another base station and setting said direction as a handover direction.

413: Calculating a weighted average of the calculated handover directions.

414: Setting the calculated weighted average as the characteristic user direction.

Fig. 4A

421: Obtaining network related data comprising user equipment data.

422: Identifying locations of static user equipment of the first cell.

423: Calculating a centre of mass point of the static user equipment.

424: Calculating a direction of the centre of mass point from the first base station.

425: Setting the calculated direction as the characteristic user direction.

Fig. 4B

431: A first characteristic user direction is determined based on a weighted average of handover directions according to steps 411-414.

432: A second characteristic user direction is determined based on an average location of static user equipment according to steps 421-425.

433: Calculating a first difference between the first characteristic user direction and the antenna azimuth direction of the first cell and a second difference between the second characteristic user direction and the antenna azimuth direction of the first cell.

Fig. 4C

METHOD FOR ANALYSING ANTENNA DIRECTIONS IN A COMMUNICATION NETWORK

TECHNICAL FIELD

The present disclosure generally relates to performance analysis of a communication network. The disclosure relates particularly, though not exclusively, to a method for analysing antenna directions in a base station of a communication network.

BACKGROUND

This section illustrates useful background information without admission of any technique described herein representative of the state of the art.

Cellular communication networks are complex systems comprising a plurality of cells serving users of the network. When users of the communication network move in the area of the network, connections of the users are seamlessly handed over between cells of the network. There are various factors that affect operation of individual cells and co-operation between the cells. In order for the communication network to operate as intended and to provide planned quality of service, cells of the communication network need to operate as planned. For example, the cells need to provide sufficient coverage without too much interfering with operation of neighbouring cells.

If antennas of cells are not pointing to the correct directions, network performance analysis and maintenance operations may not work reliably. Now a new approach for identifying such antennas is provided.

SUMMARY

The appended claims define the scope of protection. Any examples and technical descriptions of apparatuses, products and/or methods in the description and/or drawings not covered by the claims are presented not as embodiments of the solutions of the present disclosure but as background art or examples useful for understanding the present disclosure.

According to a first example aspect there is provided a computer implemented method for analysing antenna directions in a communications network. The method comprises: obtaining network related data; calculating a characteristic user direction of a first cell of a first base station; calculating a difference between the characteristic user direction and the antenna azimuth direction of the first cell; and responsive to detecting that the calculated difference is greater than a pre-set threshold angle, indicating an anomaly in the first cell.

In an embodiment, the network related data comprises handover data, and the method further comprises: calculating, for each handover from the first cell to a target cell in another base station, a direction from the first base station to said another base station and setting said direction as a handover direction; calculating a weighted average of the calculated handover directions; and setting the calculated weighted average as the characteristic user direction.

In an embodiment, the network related data comprises user equipment data, and the method further comprises: identifying locations of static user equipment of the first cell; calculating a centre of mass point of the static user equipment; calculating a direction of the centre of mass point from the first base station; and setting the calculated direction as the characteristic user direction.

In an embodiment, the method further comprises: a first characteristic user direction is determined according to the weighted average of the calculated handover directions; a second characteristic user direction is determined according to the centre of mass point from the first base station; calculating a first difference between the first characteristic user direction and the antenna azimuth direction of the first cell and a second difference between the second characteristic user direction and the antenna azimuth direction of the first cell; and responsive to detecting that the calculated first difference and the calculated second difference are both greater than the pre-set threshold angle, indicating an anomaly in the first cell.

In an embodiment, the static user equipment is any substantially static device equipped with communication capabilities.

In an embodiment, the pre-set threshold angle is 90-100 degrees.

In an embodiment, the analysing antenna directions is performed for multiple cells of the first base station.

In an embodiment, an anomaly in the first bases station is indicated in response to detecting that an anomaly is indicated in multiple cells of the first base station.

In an embodiment, the analysing antenna directions is performed for multiple base stations of the communications network.

According to a second example aspect of the present disclosure, there is provided an apparatus comprising a processor and a memory including computer program code; the memory and the computer program code configured to, with the processor, cause the apparatus to perform the method of the first aspect or any related embodiment.

According to a third example aspect there is provided a computer program comprising computer executable program code which when executed by at least one processor causes an apparatus at least to perform the method of the first aspect or any related embodiment.

According to a fourth example aspect there is provided a computer program product comprising a non-transitory computer readable medium having the computer program of the third example aspect stored thereon.

According to a fifth example aspect there is provided an apparatus comprising means for performing the method of any preceding aspect.

Any foregoing memory medium may comprise a digital data storage such as a data disc or diskette; optical storage; magnetic storage; holographic storage; opto-magnetic storage; phase-change memory; resistive random-access memory; magnetic random-access memory; solid-electrolyte memory; ferroelectric random-access memory; organic memory; or polymer memory. The memory medium may be formed into a device without other substantial functions than storing memory or it may be formed as part of a device with other functions, including but not limited to a memory of a computer; a chip set; and a sub assembly of an electronic device.

Different non-binding example aspects and embodiments have been illustrated in the foregoing. The embodiments in the foregoing are used merely to explain selected aspects or steps that may be utilized in different implementations. Some embodiments may be presented only with reference to certain example aspects. It should be appreciated that corresponding embodiments may apply to other example aspects as well.

BRIEF DESCRIPTION OF THE FIGURES

Some example embodiments will be described with reference to the accompanying figures, in which.

DETAILED DESCRIPTION

In the following description, like reference signs denote like elements or steps.

Figure 1:
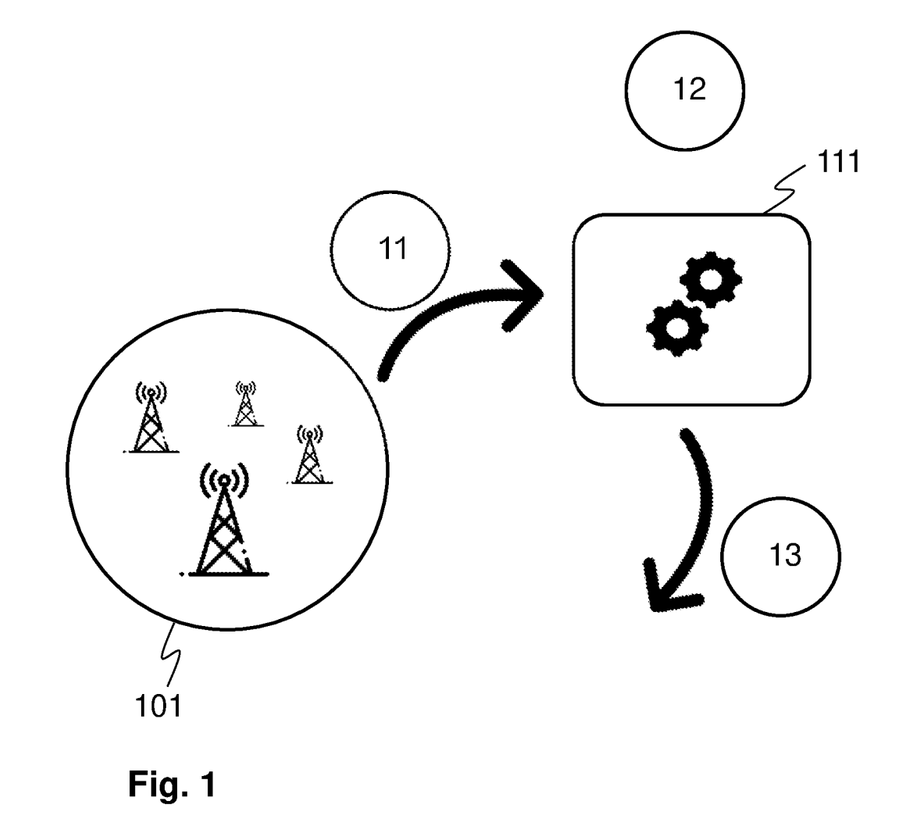
FIG. 1 shows an example scenario according to an embodiment.

FIG. 1 shows an example scenario according to an embodiment. The scenario shows a communication network 101 comprising a plurality of cells and base station sites and other network devices, and an automated system 111 configured to analyse operation of antennas of cells of a communication network.

In an embodiment of the present disclosure the scenario of FIG. 1 operates as follows: In phase 11, the automated system 111 receives data related to a network. The data may be obtained from the network and/or from a data storage. The received data may comprise any of the following: handover data, user equipment location data, antenna azimuth data, and base stations location data. Other network related data may also be comprised.

In phase 12, the automated system 111 uses the received data to analyse the operation of an antenna of a cell of a base station and calculates a characteristic user direction. The characteristic user direction describes an averaged direction from the base station to user equipment locations. The characteristic user direction is compared to the received azimuth angle of the antenna. Operation of multiple antennas of the base station or multiple antennas of multiple base stations may also be analysed.

In phase 13, the automated system 111 may indicate an anomaly in the cell or the base station if the difference between the antenna azimuth angle and the characteristic user direction is greater than a pre-set threshold angle. The automated system may indicate that the antenna is pointing in a correct direction if the characteristic user direction points approximately to the same direction as the antenna azimuth angle or the directions are within pre-set deviation.

Figure 2:
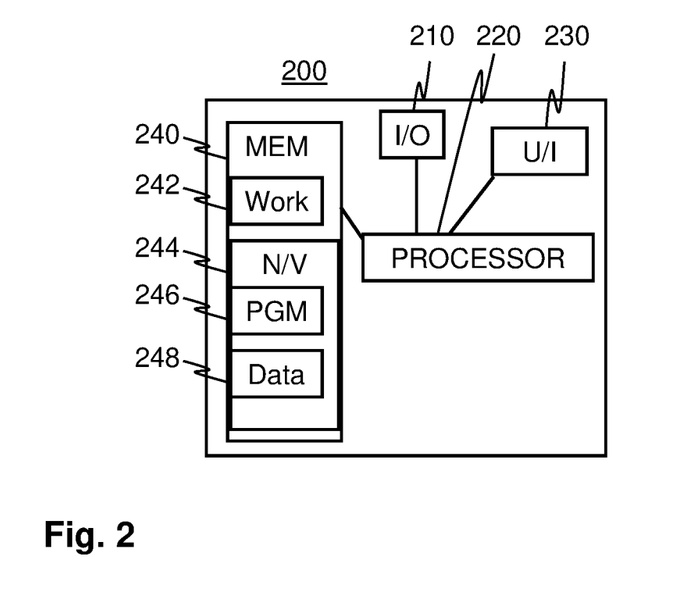
FIG. 2 shows a block diagram of an apparatus according to an example embodiment.

FIG. 2 shows a block diagram of an apparatus 200 according to an example embodiment. The apparatus 200 comprises a communication interface 210; a processor 220; a user interface 230; and a memory 240. The apparatus 200 can be used for implementing at least some embodiments of the solutions of the present disclosure. That is, with suitable configuration the apparatus 200 is suited for operating for example as the automated system 111.

The communication interface 210 comprises in an embodiment a wired and/or wireless communication circuitry, such as Ethernet; Wireless LAN; Bluetooth; GSM; CDMA; WCDMA; LTE; and/or 5G circuitry. The communication interface can be integrated in the apparatus 200 or provided as a part of an adapter, card or the like, that is attachable to the apparatus 200. The communication interface 210 may support one or more different communication technologies. The apparatus 200 may also or alternatively comprise more than one of the communication interfaces 210.

In this document, a processor may refer to a central processing unit (CPU); a microprocessor; a digital signal processor (DSP); a graphics processing unit; an application specific integrated circuit (ASIC); a field programmable gate array; a microcontroller; or a combination of such elements.

The user interface may comprise a circuitry for receiving input from a user of the apparatus 200, e.g., via a keyboard; graphical user interface shown on the display of the apparatus 200; speech recognition circuitry; or an accessory device; such as a headset; and for providing output to the user via, e.g., a graphical user interface or a loudspeaker.

The memory 240 comprises a work memory 242 and a persistent memory 244 configured to store computer program code 246 and data 248. The memory 240 may comprise any one or more of: a read-only memory (ROM); a programmable read-only memory (PROM); an erasable programmable read-only memory (EPROM); a random-access memory (RAM); a flash memory; a data disk; an optical storage; a magnetic storage; a smart card; a solid-state drive (SSD); or the like. The apparatus 200 may comprise a plurality of the memories 240. The memory 240 may be constructed as a part of the apparatus 200 or as an attachment to be inserted into a slot; port; or the like of the apparatus 200 by a user or by another person or by a robot. The memory 240 may serve the sole purpose of storing data, or be constructed as a part of an apparatus 200 serving other purposes, such as processing data.

A skilled person appreciates that in addition to the elements shown in FIG. 2, the apparatus 200 may comprise other elements, such as microphones; displays; as well as additional circuitry such as input/output (I/O) circuitry; memory chips; application-specific integrated circuits (ASIC); processing circuitry for specific purposes such as source coding/decoding circuitry; channel coding/decoding circuitry; ciphering/deciphering circuitry; and the like. Additionally, the apparatus 200 may comprise a disposable or rechargeable battery (not shown) for powering the apparatus 200 if external power supply is not available.

Figure 3:
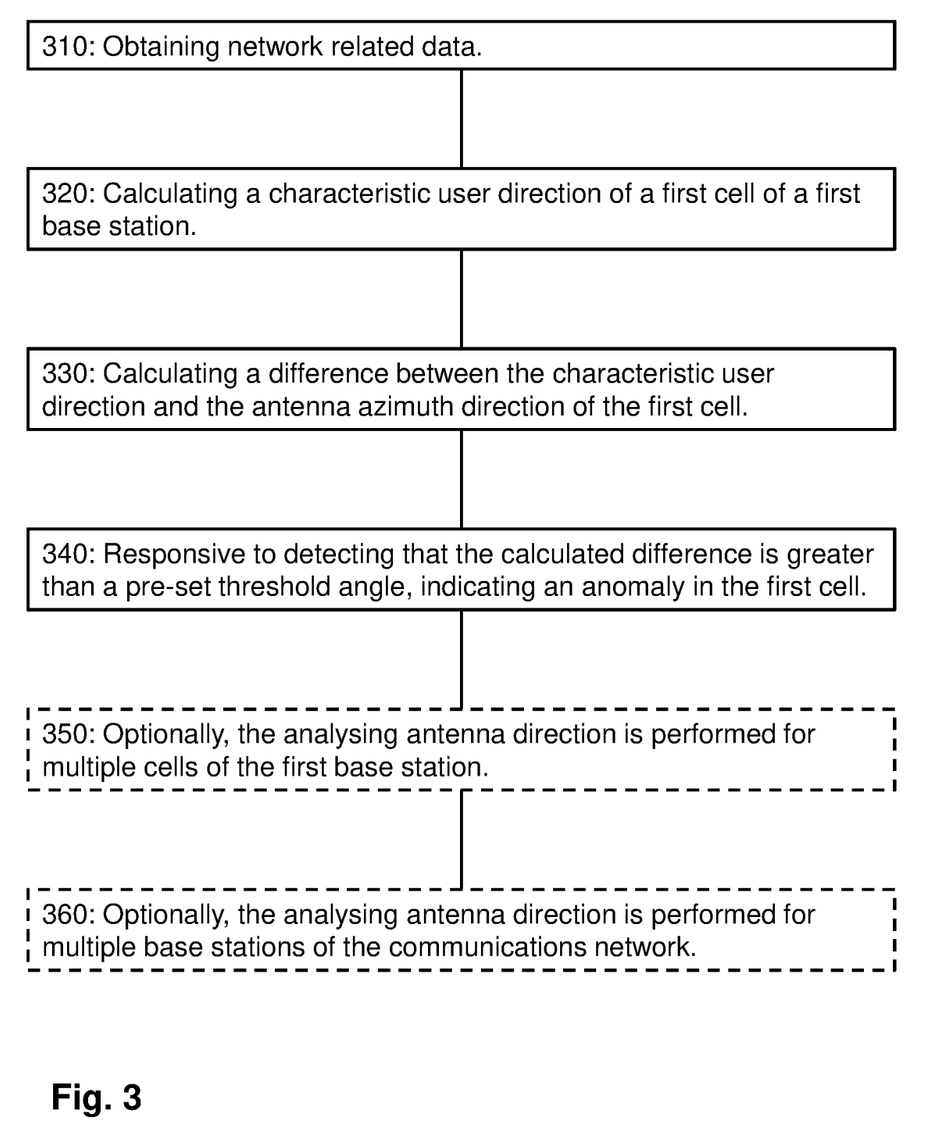
FIG. 3 shows a flow chart according to an example embodiment.

FIG. 3 shows a flow chart according to an example embodiment. FIG. 3 illustrates a computer implemented method for analysing antenna directions in a communications network comprising various possible process steps including some optional steps while also further steps can be included and/or some of the steps can be performed more than once:

310: Obtaining network related data. In an embodiment, the network related data comprises base station location data. In an embodiment, the network related data comprises antenna azimuth angle data. In an embodiment, the network related data comprises handover data. In an embodiment, the network related data comprises user equipment data. In an embodiment, the network related data or the user equipment data comprises address data or location data of the user equipment.

320: Calculating a characteristic user direction of a first cell of a first base station. The characteristic user direction is a direction from the first base station towards representative user equipment position within the first cell.

In an embodiment, the characteristic user direction is calculated as a weighted average of handover directions. Assuming that user equipment is initially connected to a source cell and the connection of the user equipment is handed over to a target cell, a handover direction may be calculated as the direction from a base station of the source cell to a base station of the target cell. The weighted average of handover directions may be calculated by accounting for the number of handovers between the source cell and each target cell.

Figure 4A:
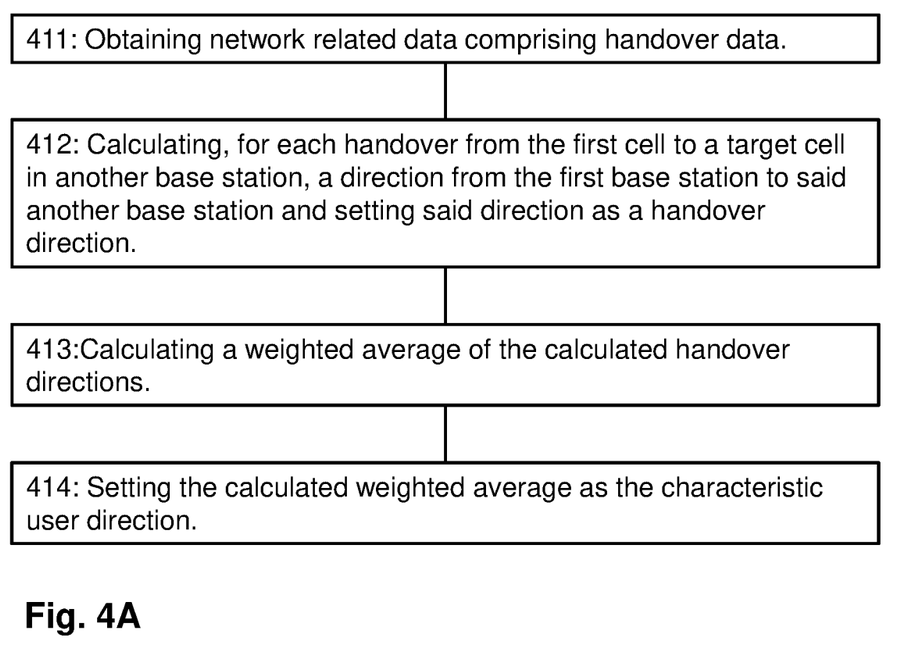
FIG. 4A-4C show flow chart according to some example embodiments for calculating characteristic user direction.

In an embodiment, the characteristic user direction based on the handover directions is calculated according to steps 411-414 of FIG. 4A.

In another embodiment, the characteristic user direction is calculated as a direction from the first base station to an average location of static user equipment. In an embodiment, the static user equipment is any substantially static device equipped with communication capabilities. The static user equipment may be wireless access points or WLAN routers, which are static within premises. The static user equipment may be a remotely readable or controllable device equipped with communication capabilities, e.g., a remotely readable water meter or a remotely controllable heating system of a building. The communications capabilities may be enabled by a subscriber identification module (SIM) card. The static user equipment may be any substantially static 10T-device comprising a communication capability. The static user equipment may be any substantially static equipment comprising a SIM card. In an example embodiment, a substantially static equipment is a fixedly mounted equipment, or an equipment used within a limited area or within a confined space.

A location of the static user equipment may be obtained from a user database based on the users address. The average location may be calculated as a centre of mass point of the locations of the static user equipment. In an embodiment, the characteristic user direction based on the static user equipment locations is calculated according to steps 421-425 of FIG. 4B.

In a further embodiment, the characteristic user direction is calculated based on both the handover directions and the static user equipment locations. In an embodiment, a first characteristic user direction is determined based on a weighted average of handover directions and a second characteristic user direction is determined based on an average location of static user equipment, as schematically shown in steps 431-433 of FIG. 4C.

- 330: Calculating a difference between the characteristic user direction and the antenna azimuth direction of the first cell. The azimuth direction is the antenna direction in the horizontal plane. In an embodiment, the antenna azimuth direction is the direction of the main beam or main lobe of said antenna. In an embodiment, the antenna azimuth direction is the central direction of the opening angle of said antenna. The azimuth angle of an antenna may be obtained, e.g., from configuration data from a base station or a database.
- 340: Responsive to detecting that the calculated difference is greater than a pre-set threshold angle, indicating an anomaly in the first cell. In an embodiment, the pre-set threshold angle is greater than or equal to 60 degrees. In an embodiment, the pre-set threshold angle is less than 180 degrees. In an embodiment, the pre-set threshold angle is 80-110 degrees, or 90-100 degrees. In some embodiments, the pre-set threshold angle may be 90 degrees, 95 degrees, 100 degrees. In an embodiment, an anomaly in the first cell is indicated in response to detecting that the calculated first difference is greater than a first pre-set threshold angle and the calculated second difference is greater than a second pre-set threshold angle. In an embodiment, the first pre-set threshold angle may be smaller than or equal to the second pre-set threshold angle. In another embodiment, the first pre-set threshold angle may be greater than or equal to the second pre-set threshold angle.
- 350: Optionally, the analysing antenna directions is performed for multiple cells of the first base station. In an embodiment, an anomaly in the first bases station is indicated in response to detecting that an anomaly is indicated in multiple cells of the first base station, preferably in 2, 3, 4, 5, 6 or more cells.
- 360: Optionally, the analysing antenna directions is performed for multiple base stations of the communications network. In an embodiment, the analysing antenna directions is performed for selected base stations of the communications network. In an embodiment, the analysing antenna directions is performed for base stations in a particular area or region of the communications network. In an embodiment, the analysing antenna directions is performed for base stations indicated by user feedback and/or network monitoring personnel and/or a network monitoring system.

Figure 4B:
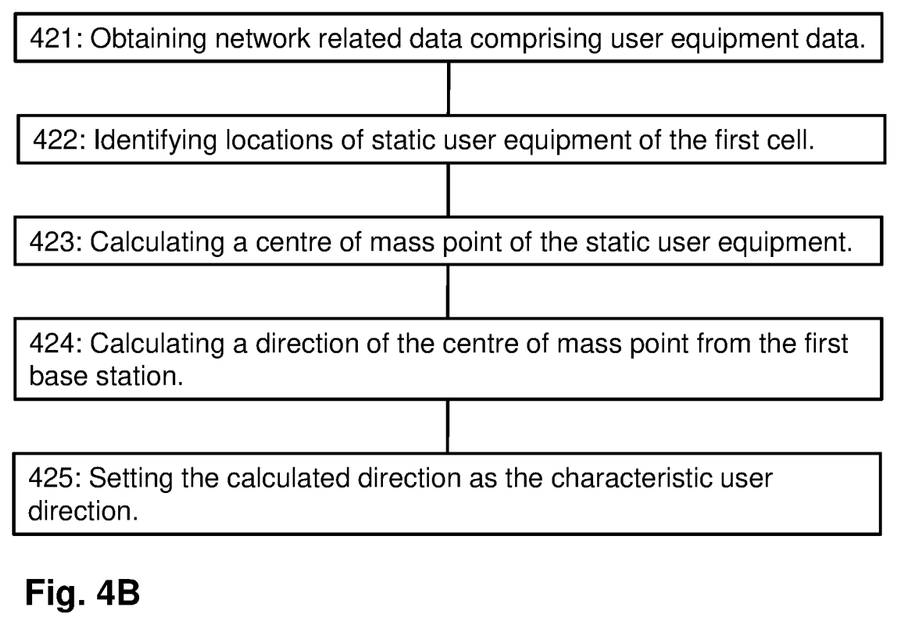
Figure 4C:
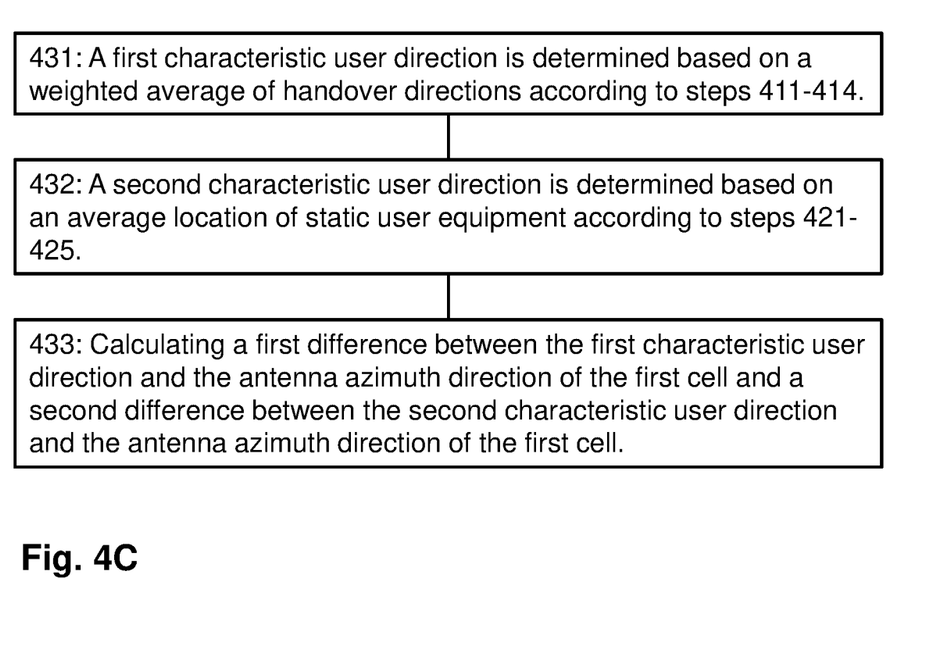

FIG. 4A-4C show flow charts according to some example embodiments for calculating the characteristic user direction. FIG. 4A illustrates a method for calculating the characteristic user direction based on handover directions:

- 411: Obtaining network related data comprising handover data.
- 412: Calculating, for each handover from the first cell to a target cell in another base station, a direction from the first base station to said another base station and setting said direction as a handover direction.
- 413: Calculating a weighted average of the calculated handover directions.
- 414: Setting the calculated weighted average as the characteristic user direction.

FIG. 4B illustrates a method for calculating the characteristic user direction based on static user equipment locations:

- 421: Obtaining network related data comprising user equipment data.
- 422: Identifying locations of static user equipment of the first cell.
- 423: Calculating a centre of mass point of the static user equipment.
- 424: Calculating a direction of the centre of mass point from the first base station.
- 425: Setting the calculated direction as the characteristic user direction.

FIG. 4C illustrates a method for calculating the characteristic user direction based on handover directions and static user equipment locations:

- 431: A first characteristic user direction is determined based on a weighted average of handover directions according to steps 411-414.
- 432: A second characteristic user direction is determined based on an average location of static user equipment according to steps 421-425.
- 433: Calculating a first difference between the first characteristic user direction and the antenna azimuth direction of the first cell and a second difference between the second characteristic user direction and the antenna azimuth direction of the first cell.

Without in any way limiting the scope, interpretation, or application of the appended claims, a technical effect of one or more of the example embodiments disclosed herein is that manual checking of antenna directions may be avoided. An advantage is also that the automated method saves time and effort, and consequently costs. A further advantage is that the disclosed method also ensures better quality in the network because cells pointing to wrong directions can be found automatically before subscriber service problems. Correction actions can be initiated immediately when site is provisioned to network.

Any of the afore described methods, method steps, or combinations thereof, may be controlled or performed using hardware; software; firmware; or any combination thereof. The software and/or hardware may be local; distributed; centralised; virtualised; or any combination thereof. Moreover, any form of computing, including computational intelligence, may be used for controlling or performing any of the afore described methods, method steps, or combinations thereof. Computational intelligence may refer to, for example, any of artificial intelligence; neural networks; fuzzy logics; machine learning; genetic algorithms; evolutionary computation; or any combination thereof.

Various embodiments have been presented. It should be appreciated that in this document, words comprise; include; and contain are each used as open-ended expressions with no intended exclusivity.

The foregoing description has provided by way of non-limiting examples of particular implementations and embodiments a full and informative description of the best mode presently contemplated by the inventors for carrying out the solutions of the present disclosure. It is however clear to a person skilled in the art that present disclosure is not restricted to details of the embodiments presented in the foregoing, but that it can be implemented in other embodiments using equivalent means or in different combinations of embodiments without deviating from the characteristics of the present disclosure.

Furthermore, some of the features of the afore-disclosed example embodiments may be used to advantage without the corresponding use of other features. As such, the foregoing description shall be considered as merely illustrative of the principles of the present disclosure, and not in limitation thereof. Hence, the scope of the present disclosure is only restricted by the appended patent claims.

The invention claimed is:

1. A computer implemented method for analysing antenna directions in a communications network, the method comprising:
   obtaining network related data, from the communications network;
   calculating a characteristic user direction of a first cell of a first base station based on the obtained network related data, wherein the characteristic user direction is a direction from the first base station towards a representative user equipment position;
   calculating a difference between the characteristic user direction and the antenna azimuth direction of the first cell; and
   responsive to detecting that the calculated difference is greater than a pre-set threshold angle, indicating an anomaly in the first cell;
   wherein calculating the characteristic user direction comprises:
      identifying locations of static user equipment of the first cell;
      calculating a centre of mass point of the locations of the static user equipment;
      calculating a direction of the centre of mass point from the first base station; and
      setting the calculated direction as the characteristic user direction.

2. The method of claim 1, wherein the locations of static user equipment are obtained from a user database based on user address.

3. The method of claim 1, wherein the static equipment is a fixedly mounted equipment, or an equipment used within a limited area or within a confined space.

4. The method of claim 1, wherein the network related data comprises handover data, and the method further comprises:
   determining a first characteristic user direction as a weighted average of handover directions, wherein
   a direction from the first base station to a target base station is calculated for each handover from the first cell to a target cell in said another base station, and the said direction is set as a handover direction;
   a weighted average of the calculated handover directions is calculated;
   the calculated weighted average is set as the first characteristic user direction; and
   calculating a first difference between the first characteristic user direction and the antenna azimuth direction of the first cell and a second difference between the characteristic user direction determined according to claim 1 and the antenna azimuth direction of the first cell; and
   responsive to detecting that the calculated first difference and the calculated second difference are both greater than the pre-set threshold angle, indicating an anomaly in the first cell.

5. The method of claim 1, wherein the static user equipment is any substantially static device equipped with communication capabilities.

6. The method of claim 1, wherein the pre-set threshold angle is 90-100 degrees.

7. The method of claim 1, wherein the analysing of the antenna directions is performed for multiple cells of the first base station.

8. The method of claim 7, wherein an anomaly in the first base station is indicated in response to detecting that an anomaly is indicated in multiple cells of the first base station.

9. The method of claim 1, wherein the analysing of the antenna directions is performed for multiple base stations of the communications network.

10. An apparatus comprising:
    a processor; and
    a memory including computer program code; the memory and the computer program code configured to, with the processor, cause the apparatus to:
    obtain network related data, from the communications network;
    calculate a characteristic user direction of a first cell of a first base station based on the obtained network related data, wherein the characteristic user direction is a direction from the first base station towards a representative user equipment position;
    calculate a difference between the characteristic user direction and the antenna azimuth direction of the first cell; and
    responsive to detecting that the calculated difference is greater than a pre-set threshold angle, to indicate an anomaly in the first cell;
    wherein calculating the characteristic user direction comprises:
       identifying locations of static user equipment of the first cell;
       calculating a centre of mass point of the locations of the static user equipment;
       calculating a direction of the centre of mass point from the first base station; and setting the calculated direction as the characteristic user direction.

11. A non-transitory memory medium comprising computer executable program code which when executed by a processor causes an apparatus to perform obtaining network related data, from the communications network;

calculating a characteristic user direction of a first cell of a first base station based on the obtained network related data, wherein the characteristic user direction is a direction from the first base station towards a representative user equipment position;

calculating a difference between the characteristic user direction and the antenna azimuth direction of the first cell; and responsive to detecting that the calculated difference is greater than a pre-set threshold angle, indicating an anomaly in the first cell;

wherein calculating the characteristic user direction comprises:

identifying locations of static user equipment of the first cell;

calculating a centre of mass point of the locations of the static user equipment;

calculating a direction of the centre of mass point from the first base station; and setting the calculated direction as the characteristic user direction.

* * * * *